Figure 1:
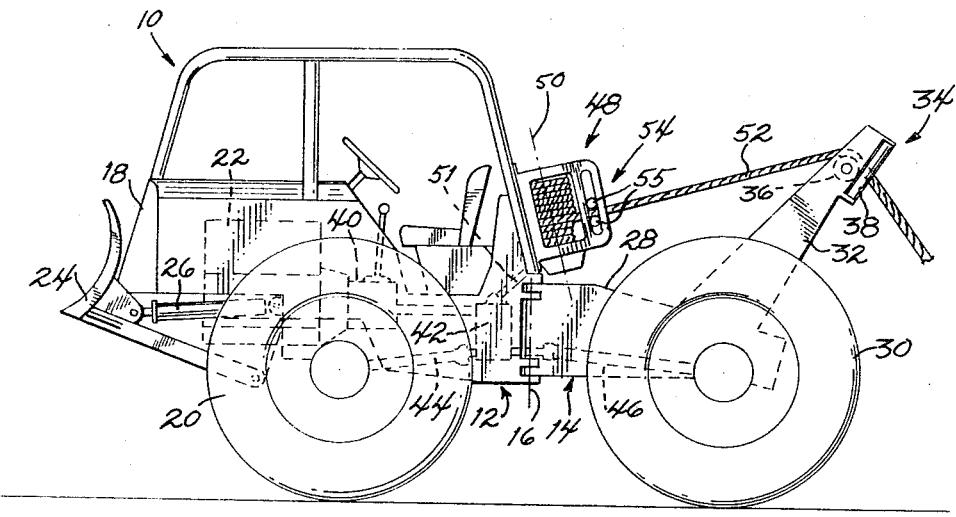

May 16, 1967  W. J. ASKINS  3,319,936

ARTICULATED LOGGER VEHICLE

Filed Jan. 26, 1966

INVENTOR
WILLIAM J. ASKINS
BY
Richard E. Backus ATT'Y.

United States Patent Office 3,319,936
Patented May 16, 1967

3,319,936
ARTICULATED LOGGER VEHICLE
William J. Askins, Libertyville, Ill., assignor to International Harvester Company, a corporation of Delaware
Filed Jan. 26, 1966, Ser. No. 523,088
8 Claims. (Cl. 254—166)

This invention relates to logger vehicles and more particularly relates to articulated logger vehicles incorporating a power winch mounted to achieve the combined advantages of conventional front- and rear-frame mounted winch designs.

Existing logger vehicles of the articulated frame design are provided with power winches to skid or drag timber and logs over rough terrain. These winches are either located on the front frame section in association with the main power plant, or on the rear frame section in alignment with the fairlead guide for the cable. Where the winch is located on the front section a simplified drive train connection with the power plant affords an inexpensive and reliable design. However, when the chassis sections are articulated for steering the fairlead guide will swing to the right or left of the winch. As the cable is reeled in with a heavy load it will flex due to this non-alignment of the fairlead with the winch, this producing excessive wear in the cable. The alternate logger design comprises a winch located on the rear frame section in association with the fairlead, thus affording exact alignment of the winch with the fairlead throughout the full angle of articulation of the frame sections. The disadvantage with this rear mounted winch design is that a flexible drive train must be provided from the power plant on the front section to the winch, thus increasing the cost and complexity of the design while decreasing reliability and reducing the power available for the winch.

Accordingly, it is an object of the present invention to provide a novel articulated logger vehicle having the power plant and winch mounted on a first frame section with a simplified drive train therebetween, and in which the winch is mounted for rotation about a substantially vertical axis so that it is aligned with the fairlead on a second frame section throughout articulated steering of the vehicle.

Another object of this invention is to provide an articulated logger vehicle having a power plant and winch mounted on the front frame section and a fairlead guide mounted on the rear frame section wherein the axis of the winch is substantially vertical to afford continuous alignment of the winch with the fairlead, and wherein a level-wind mechanism is provided to assist in reeling the cable on the winch.

Still another object of the present invention is to provide a logger vehicle having an articulated frame in which the power plant and winch are mounted on one frame section with the winch rotatable about a vertical axis and wherein a fairlead guide is mounted on an arch on the other frame section to provide clearance for chokers attached to the cable during stowage thereof.

Figure 2:
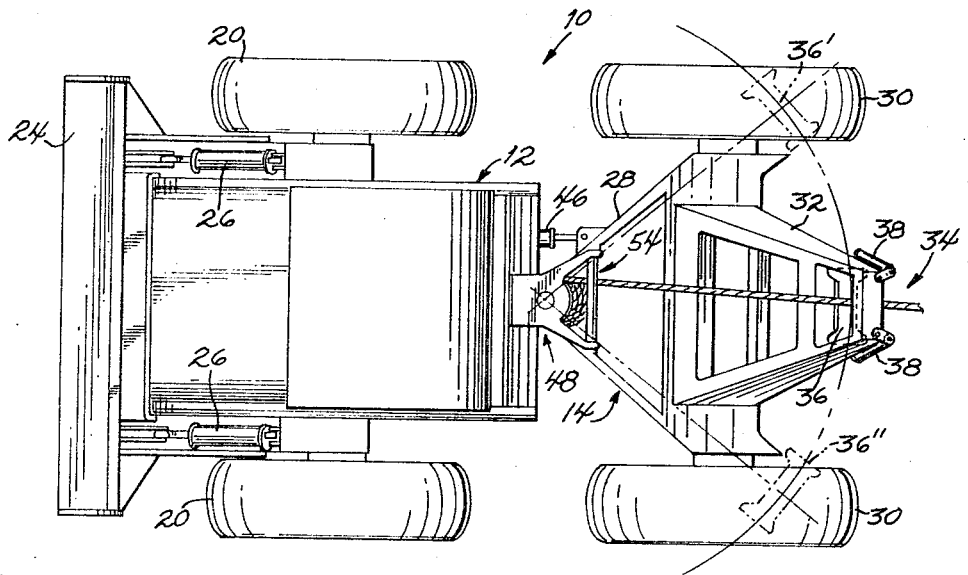

Other objects and advantages of the present invention will become apparent to those skilled in the art when the following specifications are read in conjunction with the accompanying drawings, wherein:

FIGURE 1 is a side elevational view of an articulated logger vehicle incorporating features of the present invention; and FIGURE 2 is a top plan view of the articulated logger vehicle of FIGURE 1 showing in phantom view the position of the fairlead during left and right articulated steering movements.

Referring now to the drawings and particularly FIGURE 1, an articulated logger vehicle is shown generally at 10. The vehicle 10 comprises a front chassis section 12 articulated to a rear chassis section 14 about the upright pivot axis 16. The front chassis section 12 comprises a front frame 18 supported by a pair of traction wheels 20. The motive power for the traction wheels and accessories is supplied by an engine 22 mounted on the front frame. A conventional dozer blade 24 is mounted on the front frame and is vertically adjustable by means of hydraulic rams 26.

The rear chassis section 14 comprises a rear frame 28 supported by a pair of traction wheels 30. An arch member 32 is integral with the rear frame and extends upwardly and rearwardly therefrom. A three-roller fairlead guide assembly 34 is provided at the upper margin of the arch member 32 and comprises a main roller 36 rotatable about a horizontal axis and a pair of guide rollers 38 rotatable about upwardly extending axes.

Power is supplied from the engine 22 through the transmission 40 to the power transfer case 42. The power transfer case in turn delivers power to the front traction wheels 20 through drive shaft 44 and to the rear traction wheels 30 through drive shaft 46. The drive shaft 46 includes a conventional universal connection adjacent the pivot axis 16 to permit relative rotation between the frame sections.

A winch 48 is mounted on the front frame 18 and is rotatable about the substantially vertical axis 50. The winch is driven from the power transfer case 42 by means of shaft 51. A cable 52 is reeled on the drum of winch 48 and extends rearwardly and upwardly therefrom to the fairlead assembly 34. The winch may also be provided with a conventional level-wind mechanism 54. The level-wind mechanism may include vertically spaced-apart rollers 55 for guiding the cable on the drum to prevent fouling of the winch. These rollers are vertically movable with respect to the winch as the cable is reeled to and from the winch.

The free end of the cable may also be provided with a plurality of chokers (not shown) for engaging logs or timber. It is apparent that with the winch 48 mounted on the front frame section there is adequate space between the winch and the fairlead on the rear frame section to allow for stowage of such chokers during roadway operation of the vehicle 10.

As the cable 52 is reeled in with a heavy load of logs or timber the cable is guided over the main roller 36 of the fairlead to the winch 48 in a plane which is substantially perpendicular to the axis 50 of the winch. Thus, in any steering position of the frame sections there is no lateral flexing of the cable as it passes through the rollers of the level-wind mechanism 54. This feature eliminates wear points and materially increases the working life of the cable. In the preferred embodiment illustrated in FIGURE 1 the axis 50 of the winch is slightly inclined rearwardly to permit the cable to directly feed into the winch from the fairlead 34, which is positioned at a high elevation on the arch 32.

It is apparent that the vertical mounting feature of the winch provides an automatic alignment of the winch with respect to the fairlead notwithstanding a steering movement of the vehicle. As best shown in FIG. 2 this alignment is maintained in both the right-hand steering position 36' and the left-hand steering position 36". The design of the present invention further affords a simplified drive shaft connection 51 between the transfer case 42 and winch 48. An expensive and complicated universal drive connection is not required to deliver power to the winch. Thus applicant has provided a logger vehicle incorporating the desirable features of both front- and rear-frame mounted winch designs.

It will be understood that various changes in the details and arrangement of parts, which have been described and illustrated in order to explain the nature of the in-

What is claimed is:

1. An articulated logger vehicle including the combination of: a first frame; a second frame articulated to the first frame about a first upright axis; a winch mounted on the first frame and rotatable about a second upright axis, the winch having an extensible and retractable cable; and, means on the second frame for guiding the cable to and from the winch.

2. An articulated logger vehicle as defined in claim 1 and further including: motive power means on the first frame; and, means connected with the power means for driving the winch.

3. An articulated logger vehicle as defined in claim 1 wherein: the winch includes a drum rotatable about the second axis; and, the first axis intersects the drum whereby the drum remains aligned relative to the guide means during articulation of the vehicle about the first axis.

4 and further including means to level-wind the cable on the winch as the cable is reeled on the drum.
ber mounted on the second frame and extending upwardly therefrom, and a fairlead roller mounted on the arch member for guiding the free end of the cable to and from the drum.

5. An articulated logger vehicle as defined in claim 4 and further including means to level-wind the cable on the winch as the cable is reeled on the drum.

6. An articulated logger vehicle as defined in claim 4 wherein: the fairlead is mounted on the arch at a remote position from the winch allowing a substantial clearance on the second frame for stowage of chokers affixed to the cable.

7. An articulated logger vehicle as defined in claim 1 wherein: the guide means is positioned to guide the cable to and from the winch in a plane substantially perpendicular to the second axis throughout articulation of the first and second frames.

8. An articulated logger vehicle as defined in claim 1 wherein: the second axis is positioned substantially adjacent to the first axis whereby the cable is guided to and from the winch substantially in a plane having a given angular relationship to the winch during articulation of the vehicle about the first axis.

References Cited by the Examiner

UNITED STATES PATENTS

| 1,941,250 | 12/1933 | Dale | 254—190 |
| 1,945,976 | 2/1934 | Nourse | 254—166 |
| 3,049,186 | 8/1962 | Garrett | 254—166 |

EVON C. BLUNK, *Primary Examiner.*

H. C. HORNSBY, *Assistant Examiner.*